(12) United States Patent
Aleem et al.

(10) Patent No.: US 10,199,008 B2
(45) Date of Patent: Feb. 5, 2019

(54) SYSTEMS, DEVICES, AND METHODS FOR WEARABLE ELECTRONIC DEVICES AS STATE MACHINES

(71) Applicant: North Inc., Kitchener (CA)

(72) Inventors: Idris S. Aleem, Pickering (CA);
Pedram Ataee, Waterloo (CA);
Stephen Lake, Kitchener (CA)

(73) Assignee: NORTH INC., Kitchener (CA)

( * ) Notice: Subject to any disclaimer, the term of this patent is extended or adjusted under 35 U.S.C. 154(b) by 0 days.

(21) Appl. No.: 14/669,878

(22) Filed: Mar. 26, 2015

(65) Prior Publication Data

US 2015/0277575 A1 Oct. 1, 2015

Related U.S. Application Data

(60) Provisional application No. 61/971,346, filed on Mar. 27, 2014.

(51) Int. Cl.
*G06F 3/01* (2006.01)
*G09G 5/00* (2006.01)
*G06F 1/16* (2006.01)

(52) U.S. Cl.
CPC .......... *G09G 5/006* (2013.01); *G06F 1/163* (2013.01); *G06F 1/1694* (2013.01); *G06F 3/015* (2013.01); *G06F 3/016* (2013.01)

(58) Field of Classification Search
CPC .......... G06F 1/163; G06F 3/014; G06F 3/017; G06F 3/0346
See application file for complete search history.

(56) References Cited

U.S. PATENT DOCUMENTS

| | | | |
|---|---|---|---|
| 1,411,995 A | 4/1922 | Dull | |
| 3,620,208 A | 11/1971 | Higley et al. | |

(Continued)

FOREIGN PATENT DOCUMENTS

| | | |
|---|---|---|
| CN | 102246125 A | 11/2011 |
| DE | 44 12 278 A1 | 10/1995 |

(Continued)

OTHER PUBLICATIONS

Jason Brownlee, "Finite State Machines as a Control Technique in Artificial Intelligence", Jun. 2002.*

(Continued)

*Primary Examiner* — Benjamin C Lee
*Assistant Examiner* — Dong Hui Liang
(74) *Attorney, Agent, or Firm* — Cozen O'Connor

(57) ABSTRACT

Systems, devices, and methods that implement state machine models in wearable electronic devices are described. A wearable electronic device stores processor-executable gesture identification instructions that, when executed by an on-board processor, enable the wearable electronic device to identify one or more gesture(s) performed by a user. The wearable electronic device also stores processor-executable state determination instructions that, when executed by the processor, cause the wearable electronic device to enter into and transition between various operational states depending on signals detected by on-board sensors. The state machine models described herein enable the wearable electronic devices to identify and automatically recover from operational errors, malfunctions, or crashes with minimal intervention from the user.

19 Claims, 3 Drawing Sheets

(56) References Cited

U.S. PATENT DOCUMENTS

| | | |
|---|---|---|
| 3,880,146 A | 4/1975 | Everett et al. |
| 4,602,639 A | 7/1986 | Hoogendoorn et al. |
| 4,705,408 A | 11/1987 | Jordi |
| 4,817,064 A | 3/1989 | Milles |
| 5,003,978 A | 4/1991 | Dunseath, Jr. |
| D322,227 S | 12/1991 | Warhol |
| 5,081,852 A | 1/1992 | Cox |
| 5,251,189 A | 10/1993 | Thorp |
| D348,660 S | 7/1994 | Parsons |
| 5,445,869 A | 8/1995 | Ishikawa et al. |
| 5,482,051 A | 1/1996 | Reddy et al. |
| 5,605,059 A | 2/1997 | Woodward |
| 5,683,404 A | 11/1997 | Johnson |
| 6,032,530 A | 3/2000 | Hock |
| 6,184,847 B1 | 2/2001 | Fateh et al. |
| 6,238,338 B1 | 5/2001 | DeLuca et al. |
| 6,244,873 B1 | 6/2001 | Hill et al. |
| 6,377,277 B1 | 4/2002 | Yamamoto |
| D459,352 S | 6/2002 | Giovanniello |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,720,984 B1 | 4/2004 | Jorgensen et al. |
| 6,743,982 B2 | 6/2004 | Biegelsen et al. |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,927,343 B2 | 8/2005 | Watanabe et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,086,218 B1 | 8/2006 | Pasach |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,450,107 B2 | 11/2008 | Radley-Smith |
| 7,491,892 B2 | 2/2009 | Wagner et al. |
| 7,517,725 B2 | 4/2009 | Reis |
| 7,558,622 B2 | 7/2009 | Tran |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,809,435 B1 | 10/2010 | Ettare et al. |
| 7,844,310 B2 | 11/2010 | Anderson |
| 7,870,211 B2 | 1/2011 | Pascal et al. |
| 7,925,100 B2 | 4/2011 | Howell et al. |
| 7,948,763 B2 | 5/2011 | Chuang |
| D643,428 S | 8/2011 | Janky et al. |
| D646,192 S | 10/2011 | Woode |
| 8,054,061 B2 | 11/2011 | Prance et al. |
| D654,622 S | 2/2012 | Hsu |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| 8,355,671 B2 | 1/2013 | Kramer et al. |
| 8,389,862 B2 | 3/2013 | Arora et al. |
| 8,421,634 B2 | 4/2013 | Tan et al. |
| 8,427,977 B2 | 4/2013 | Workman et al. |
| D682,727 S | 5/2013 | Bulgari |
| 8,447,704 B2 | 5/2013 | Tan et al. |
| 8,467,270 B2 | 6/2013 | Gossweiler, III et al. |
| 8,469,741 B2 | 6/2013 | Oster et al. |
| D689,862 S | 9/2013 | Liu |
| 8,591,411 B2 | 11/2013 | Banet et al. |
| D695,454 S | 12/2013 | Moore |
| 8,620,361 B2 | 12/2013 | Bailey et al. |
| 8,624,124 B2 | 1/2014 | Koo et al. |
| 8,702,629 B2 | 4/2014 | Giuffrida et al. |
| 8,704,882 B2 | 4/2014 | Turner |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,883,287 B2 | 11/2014 | Boyce et al. |
| 8,895,865 B2 | 11/2014 | Lenahan et al. |
| 8,912,094 B2 | 12/2014 | Koo et al. |
| 8,922,481 B1 | 12/2014 | Kauffmann et al. |
| 8,954,135 B2 | 2/2015 | Yuen et al. |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,086,687 B2 | 7/2015 | Park et al. |
| D736,664 S | 8/2015 | Paradise et al. |
| 9,146,730 B2 | 9/2015 | Lazar |
| D741,855 S | 10/2015 | Park et al. |
| D742,272 S | 11/2015 | Bailey et al. |
| D742,874 S | 11/2015 | Cheng et al. |
| D743,963 S | 11/2015 | Osterhout |
| 9,211,417 B2 | 12/2015 | Heldman et al. |
| D747,714 S | 1/2016 | Erbeus |
| D750,623 S | 3/2016 | Park et al. |
| D751,065 S | 3/2016 | Magi |
| 9,299,248 B2 | 3/2016 | Lake et al. |
| D756,359 S | 5/2016 | Bailey et al. |
| 9,367,139 B2 | 6/2016 | Ataee et al. |
| 9,372,535 B2 | 6/2016 | Bailey et al. |
| 9,393,418 B2 | 7/2016 | Giuffrida et al. |
| 9,418,927 B2 | 8/2016 | Axisa et al. |
| 9,439,566 B2 | 9/2016 | Arne et al. |
| 9,472,956 B2 | 10/2016 | Michaelis et al. |
| 9,477,313 B2 | 10/2016 | Mistry et al. |
| 9,529,434 B2 | 12/2016 | Choi et al. |
| 2002/0032386 A1 | 3/2002 | Sackner et al. |
| 2002/0077534 A1 | 6/2002 | DuRousseau |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2004/0068409 A1 | 4/2004 | Tanaka et al. |
| 2004/0073104 A1 | 4/2004 | Brun del Re et al. |
| 2004/0194500 A1 | 10/2004 | Rapport |
| 2004/0210165 A1 | 10/2004 | Marmaropoulos et al. |
| 2005/0005637 A1 | 1/2005 | Rapport |
| 2005/0012715 A1 | 1/2005 | Ford |
| 2005/0070227 A1 | 3/2005 | Shen et al. |
| 2005/0119701 A1 | 6/2005 | Lauter et al. |
| 2005/0177038 A1 | 8/2005 | Kolpin et al. |
| 2006/0037359 A1 | 2/2006 | Stinespring |
| 2006/0061544 A1 | 3/2006 | Min et al. |
| 2007/0132785 A1 | 6/2007 | Ebersole, Jr. et al. |
| 2008/0136775 A1 | 6/2008 | Conant |
| 2009/0007597 A1 | 1/2009 | Hanevold |
| 2009/0031757 A1 | 2/2009 | Harding |
| 2009/0040016 A1 | 2/2009 | Ikeda |
| 2009/0051544 A1 | 2/2009 | Niknejad |
| 2009/0102580 A1 | 4/2009 | Uchaykin |
| 2009/0109241 A1 | 4/2009 | Tsujimoto |
| 2009/0147004 A1 | 6/2009 | Ramon et al. |
| 2009/0179824 A1 | 7/2009 | Tsujimoto et al. |
| 2009/0189867 A1 | 7/2009 | Krah et al. |
| 2009/0251407 A1 | 10/2009 | Flake et al. |
| 2009/0258669 A1 | 10/2009 | Nie et al. |
| 2009/0318785 A1 | 12/2009 | Ishikawa et al. |
| 2009/0326406 A1* | 12/2009 | Tan .................. G06F 3/015 600/546 |
| 2009/0327171 A1 | 12/2009 | Tan et al. |
| 2010/0041974 A1 | 2/2010 | Ting et al. |
| 2010/0280628 A1 | 11/2010 | Sankai |
| 2010/0293115 A1 | 11/2010 | Seyed Momen |
| 2010/0317958 A1 | 12/2010 | Beck et al. |

(56) References Cited

U.S. PATENT DOCUMENTS

| | | |
|---|---|---|
| 2011/0018754 A1 | 1/2011 | Tojima et al. |
| 2011/0025982 A1* | 2/2011 | Takahashi ............ G03B 21/14 353/15 |
| 2011/0072510 A1 | 3/2011 | Cheswick |
| 2011/0134026 A1 | 6/2011 | Kang et al. |
| 2011/0166434 A1 | 7/2011 | Gargiulo |
| 2011/0172503 A1 | 7/2011 | Knepper et al. |
| 2011/0181527 A1 | 7/2011 | Capela et al. |
| 2011/0213278 A1 | 9/2011 | Horak et al. |
| 2011/0224556 A1 | 9/2011 | Moon et al. |
| 2011/0224564 A1 | 9/2011 | Moon et al. |
| 2012/0029322 A1 | 2/2012 | Wartena et al. |
| 2012/0051005 A1 | 3/2012 | Vanfleteren et al. |
| 2012/0053439 A1 | 3/2012 | Ylostalo et al. |
| 2012/0101357 A1 | 4/2012 | Hoskuldsson et al. |
| 2012/0157789 A1 | 6/2012 | Kangas et al. |
| 2012/0165695 A1 | 6/2012 | Kidmose et al. |
| 2012/0182309 A1 | 7/2012 | Griffin et al. |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0226130 A1 | 9/2012 | De Graff et al. |
| 2012/0265090 A1 | 10/2012 | Fink et al. |
| 2012/0293548 A1 | 11/2012 | Perez et al. |
| 2012/0302858 A1 | 11/2012 | Kidmose et al. |
| 2012/0323521 A1 | 12/2012 | De Foras et al. |
| 2013/0005303 A1 | 1/2013 | Song et al. |
| 2013/0020948 A1 | 1/2013 | Han et al. |
| 2013/0027341 A1 | 1/2013 | Mastandrea |
| 2013/0080794 A1 | 3/2013 | Hsieh |
| 2013/0127708 A1 | 5/2013 | Jung et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0265229 A1* | 10/2013 | Forutanpour ............ G06F 3/014 345/158 |
| 2013/0265437 A1 | 10/2013 | Thörn et al. |
| 2013/0271292 A1 | 10/2013 | McDermott |
| 2013/0312256 A1 | 11/2013 | Wesselmann et al. |
| 2013/0317648 A1 | 11/2013 | Assad |
| 2013/0332196 A1 | 12/2013 | Pinsker |
| 2014/0020945 A1 | 1/2014 | Hurwitz et al. |
| 2014/0028539 A1 | 1/2014 | Newham et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0094675 A1 | 4/2014 | Luna et al. |
| 2014/0121471 A1 | 5/2014 | Walker |
| 2014/0122958 A1 | 5/2014 | Greenebrg et al. |
| 2014/0132512 A1* | 5/2014 | Gomez Sainz-Garcia ................ G06F 3/014 345/158 |
| 2014/0194062 A1 | 7/2014 | Palin et al. |
| 2014/0198034 A1 | 7/2014 | Bailey et al. |
| 2014/0198035 A1 | 7/2014 | Bailey et al. |
| 2014/0236031 A1 | 8/2014 | Banet et al. |
| 2014/0240103 A1 | 8/2014 | Lake et al. |
| 2014/0249397 A1 | 9/2014 | Lake et al. |
| 2014/0257141 A1 | 9/2014 | Giuffrida et al. |
| 2014/0285326 A1 | 9/2014 | Luna et al. |
| 2014/0299362 A1 | 10/2014 | Park et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0349257 A1 | 11/2014 | Connor |
| 2014/0375465 A1 | 11/2014 | Fenuccio et al. |
| 2014/0354528 A1 | 12/2014 | Laughlin et al. |
| 2014/0354529 A1 | 12/2014 | Laughlin et al. |
| 2014/0364703 A1 | 12/2014 | Kim et al. |
| 2015/0011857 A1 | 1/2015 | Henson et al. |
| 2015/0025355 A1 | 1/2015 | Bailey et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0084860 A1 | 3/2015 | Aleem et al. |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0141784 A1 | 5/2015 | Morun et al. |
| 2015/0148641 A1 | 5/2015 | Morun et al. |
| 2015/0160621 A1 | 6/2015 | Yilmaz |
| 2015/0182113 A1 | 7/2015 | Utter, II |
| 2015/0182130 A1 | 7/2015 | Utter, II |
| 2015/0182163 A1 | 7/2015 | Utter |
| 2015/0182164 A1 | 7/2015 | Utter, II |
| 2015/0185838 A1* | 7/2015 | Camacho-Perez ...... G06F 3/014 345/156 |
| 2015/0186609 A1 | 7/2015 | Utter, II |
| 2015/0216475 A1 | 8/2015 | Luna et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0261306 A1 | 9/2015 | Lake |
| 2015/0296553 A1 | 10/2015 | DiFranco et al. |
| 2015/0325202 A1 | 11/2015 | Lake et al. |
| 2015/0370333 A1 | 12/2015 | Ataee et al. |
| 2016/0020500 A1 | 1/2016 | Matsuda |
| 2016/0150636 A1 | 5/2016 | Otsubo |
| 2016/0156762 A1 | 6/2016 | Bailey et al. |
| 2016/0199699 A1 | 7/2016 | Klassen |
| 2016/0202081 A1 | 7/2016 | Debieuvre et al. |
| 2016/0274758 A1 | 9/2016 | Bailey |
| 2016/0309249 A1 | 10/2016 | Wu et al. |
| 2016/0313899 A1 | 10/2016 | Noel |

FOREIGN PATENT DOCUMENTS

| | | |
|---|---|---|
| EP | 0 301 790 A2 | 2/1989 |
| JP | 2009-50679 A | 3/2009 |
| KR | 20120094870 A | 8/2012 |
| KR | 20120097997 A | 9/2012 |
| WO | 2011/070554 A2 | 6/2011 |

OTHER PUBLICATIONS

Costanza et al., "EMG as a Subtle Input Interface for Mobile Computing," Mobile HCI 2004, LNCS 3160, edited by S. Brewster and M. Dunlop, Springer-Verlag Berlin Heidelberg, pp. 426-430, 2004.

Costanza et al., "Toward Subtle Intimate Interfaces for Mobile Devices Using an EMG Controller," CHI 2005, Proceedings of the SIGCHI Conference on Human Factors in Computing Systems, pp. 481-489, 2005.

Ghasemzadeh et al., "A Body Sensor Network With Electromyogram and Inertial Sensors: Multimodal Interpretation of Muscular Activities," IEEE Transactions on Information Technology in Biomedicine, vol. 14, No. 2, pp. 198-206, Mar. 2010.

Gourmelon et al., "Contactless sensors for Surface Electromyography," Proceedings of the 28th IEEE EMBS Annual International Conference, New York City, NY, Aug. 30-Sep. 3, 2006, pp. 2514-2517.

International Search Report and Written Opinion, dated May 16, 2014, for corresponding International Application No. PCT/US2014/017799, 9 pages.

International Search Report and Written Opinion, dated Aug. 21, 2014, for corresponding International Application No. PCT/US2014/037863, 10 pages.

International Search Report and Written Opinion, dated Nov. 21, 2014, for corresponding International Application No. PCT/US2014/052143, 9 pages.

International Search Report and Written Opinion, dated Feb. 27, 2015, for corresponding International Application No. PCT/US2014/067443, 10 pages.

International Search Report and Written Opinion, dated May 27, 2015, for corresponding International Application No. PCT/US2015/015675, 9 pages.

Morris et al., "Emerging Input Technologies for Always-Available Mobile Interaction," *Foundations and Trends in Human-Computer Interaction* 4(4):245-316, 2010. (74 total pages).

(56) References Cited

OTHER PUBLICATIONS

Naik et al., "Real-Time Hand Gesture Identification for Human Computer Interaction Based on ICA of Surface Electromyogram," IADIS International Conference Interfaces and Human Computer Interaction 2007, 8 pages.

Picard et al., "Affective Wearables," Proceedings of the IEEE 1st International Symposium on Wearable Computers, ISWC, Cambridge, MA, USA, Oct. 13-14, 1997, pp. 90-97.

Rekimoto, "GestureWrist and GesturePad: Unobtrusive Wearable Interaction Devices," ISWC '01 Proceedings of the 5th IEEE International Symposium on Wearable Computers, 2001, 7 pages.

Saponas et al., "Making Muscle-Computer Interfaces More Practical," CHI 2010, Atlanta, Georgia, USA, Apr. 10-15, 2010, 4 pages.

Sato et al., "Touche: Enhancing Touch Interaction on Humans, Screens, Liquids, and Everyday Objects," CHI' 12, May 5-10, 2012, Austin, Texas.

Ueno et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007.

Ueno et al., "Feasibility of Capacitive Sensing of Surface Electromyographic Potential through Cloth," *Sensors and Materials* 24(6):335-346, 2012.

Xiong et al., "A Novel HCI based on EMG and IMU," Proceedings of the 2011 IEEE International Conference on Robotics and Biomimetics, Phuket, Thailand, Dec. 7-11, 2011, 5 pages.

Zhang et al., "A Framework for Hand Gesture Recognition Based on Accelerometer and EMG Sensors," IEEE Transactions on Systems, Man, and Cybernetics—Part A: Systems and Humans, vol. 41, No. 6, pp. 1064-1076, Nov. 2011.

Xu et al., "Hand Gesture Recognition and Virtual Game Control Based on 3D Accelerometer and EMG Sensors," Proceedings of the 14th international conference on Intelligent user interfaces, Sanibel Island, Florida, Feb. 8-11, 2009, pp. 401-406.

Communication pursuant to Rule 164(1) EPC, dated Sep. 30, 2016, for corresponding EP Application No. 14753949.8, 7 pages.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Merriam-Webster, "Radio Frequencies" retrieved from https://www.merriam-webster.com/table/collegiate/radiofre.htm, retrieved on Jul. 12, 2017, 2 pages.

\* cited by examiner

SYSTEMS, DEVICES, AND METHODS FOR WEARABLE ELECTRONIC DEVICES AS STATE MACHINES

BACKGROUND

Technical Field

The present systems, devices, and methods generally relate to wearable electronic devices and particularly relate to implementing a wearable electronic device as a state machine.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other electronic systems; however, a small and lightweight electronic device may still be considered portable even if it includes a wire-connection to another electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Most electronic devices experience an operational error, malfunction, or "crash" at some point during their use. When non-wearable electronic devices crash (including portable electronic devices such as smartphones and non-portable electronic devices such as televisions), the user typically has access to the device and at least one hand available to manipulate and troubleshoot the device's controls (or the device itself). However, wearable electronic devices are particularly well-suited for use in "hands-free" applications during which the user may not be able to readily access the device (e.g., while the user is running or skiing, or wearing gloves) and/or during which the user's hands may be otherwise occupied (e.g., while the user is engaged in another task, such as cooking a meal, driving, or performing surgery). When a wearable electronic device experiences an operational error, malfunction, or crash, the user may be unable to address the issue for quite some time. Furthermore, as some wearable electronic devices do not include data displays and/or have few to no control inputs, the user may have very limited ability to diagnose, troubleshoot, and/or resolve an operational error, malfunction, or crash without, for example, first connecting the wearable electronic device to a general purpose computer. There is a need in the art for improved systems, devices, and methods for entering a wearable electronic device into normal operation mode, and for restoring normal operation in a wearable electronic device that has experienced an operational error, malfunction, and/or crash.

State Machines

A state machine, or "finite state machine," is a model that describes the operation of a device, apparatus, or system (hereafter, "system"). The model provides a set of states for the system, where the system can only be in one state at a time. Each state corresponds to a particular behavior of the system, such as a particular way in which the system will respond to certain inputs or stimuli. Each state also includes a set of conditions that, when met, cause the system to enter into that state and/or a set of conditions that, when met, cause the system to transition out of that state and enter into another particular state.

The state machine model may be implemented in order to automate the operation of a system.

Human-Electronics Interfaces

A portable electronic device may provide direct functionality for a user (such as audio playback, data display, computing functions, etc.) or it may provide electronics to interact with, receive information from, or control another electronic device. For example, a wearable electronic device may include sensors that detect inputs from a user and transmit signals to another electronic device based on those inputs. Sensor-types and input-types may each take on a variety of forms, including but not limited to: tactile sensors (e.g., buttons, switches, touchpads, or keys) providing manual control, acoustic sensors providing voice-control, electromyography sensors providing gesture control, and/or accelerometers providing gesture control.

A human-computer interface ("HCI") is an example of a human-electronics interface. The present systems, devices, and methods may be applied to HCIs, but may also be applied to any other form of human-electronics interface.

Electromyography Devices

Electromyography ("EMG") is a process for detecting and processing the electrical signals generated by muscle activity. EMG devices employ EMG sensors that are responsive to the range of electrical potentials (typically µV-mV) involved in muscle activity. EMG signals may be used in a wide variety of applications, including: medical monitoring and diagnosis, muscle rehabilitation, exercise and training, prosthetic control, and even in controlling functions of electronic devices.

BRIEF SUMMARY

A wearable electronic device may be summarized as including: at least one sensor responsive to at least one input effected by a user of the wearable electronic device, wherein in response to the at least one input the at least one sensor provides sensor signals; a processor communicatively coupled to the at least one sensor; and a non-transitory processor-readable storage medium communicatively coupled to the processor, wherein the non-transitory processor-readable storage medium stores processor-executable sensor signal processing instructions and processor-executable state determination instructions, and wherein when executed by the processor, the state determination instructions cause the wearable electronic device to: in response to a determination that the sensor signal processing instructions are not calibrated, enter a standby state wherein in the standby state the wearable electronic device recognizes a first indication from the user; in response to a recognition of the first indication from the user while the wearable electronic device is in the standby state, enter a calibration state wherein in the calibration state the wearable electronic device recognizes a second indication from the user and calibrates the sensor signal processing instructions in response to the second indication from the user; and in response to calibrating the sensor signal processing instructions while the wearable electronic device is in the calibration state, enter an active state wherein in the active state the wearable electronic device executes the calibrated sensor signal processing instructions, and wherein when executed by the processor the calibrated sensor signal processing instructions cause the wearable electronic device to process at least one input effected by the user based at least in part on the calibration of the sensor signal processing instructions from the calibration state.

The at least one sensor may be responsive to at least one gesture performed by the user and may provide sensor signals in response to the at least one gesture. The processor-executable sensor signal processing instructions may include processor-executable gesture identification instructions that, when executed by the processor while the wearable electronic device is in the active state, cause the wearable electronic device to identify at least one gesture performed by the user based at least in part on the calibration of the gesture identification instructions from the calibration state. The first indication from the user may include a rest gesture performed by the user, the rest gesture indicative that the user is ready to calibrate the gesture identification instructions, and the non-transitory processor-readable storage medium may further store processor-executable instructions that, when executed by the processor, cause the wearable electronic device to recognize the rest gesture as the first indication from the user in the standby state. The first indication from the user may include a recognition by the wearable electronic device that the user has donned the wearable electronic device, and the non-transitory processor-readable storage medium may further store processor-executable instructions that, when executed by the processor, cause the wearable electronic device to recognize when the user dons the wearable electronic device as the first indication from the user in the standby state. The non-transitory processor-readable storage medium may further store processor-executable instructions that, when executed by the processor, cause the wearable electronic device to: recognize at least one reference gesture performed by the user as the second indication from the user in the calibration state; and calibrate the gesture identification instructions based on the at least one reference gesture.

The at least one sensor may include at least one muscle activity sensor selected from the group consisting of: an electromyography ("EMG") sensor and a mechanomyography ("MMG") sensor. The at least one sensor may include at least one inertial sensor selected from the group consisting of: an inertial measurement unit, an accelerometer, and a gyroscope. The wearable electronic device may further include at least one light-emitting diode ("LED") communicatively coupled to the processor, and the non-transitory processor-readable storage medium may further store processor-executable instructions that, when executed by the processor, cause the wearable electronic device to activate at least one of: a first color of the at least one LED in response to entering the standby state; a second color of the at least one LED in response to entering the calibration state; and/or a third color of the at least one LED in response to entering the active state.

The wearable electronic device may include a haptic feedback device communicatively coupled to the processor, and the non-transitory processor-readable storage medium may further store processor-executable instructions that, when executed by the processor, cause the wearable electronic device to activate the haptic feedback module in response to at least one of: entering the standby state; entering the calibration state; and/or entering the active state.

A method of operating a wearable electronic device as a state machine, the wearable electronic device including at least one sensor responsive to at least one input effected by a user of the wearable electronic device, wherein in response to the at least one input the at least one sensor provides sensor signals, a processor communicatively coupled to the at least one sensor, and a non-transitory processor-readable storage medium communicatively coupled to the processor, wherein the non-transitory processor-readable storage medium stores at least processor-executable sensor signal processing instructions, may be summarized as including: entering the wearable electronic device into a standby state in response to a determination that the sensor signal processing instructions are not calibrated; while the wearable electronic device is in the standby state: detecting a first indication from the user by the wearable electronic device, the first indication from the user indicative that the user is ready to calibrate the sensor signal processing instructions; and recognizing the first indication from the user by the processor; entering the wearable electronic device into a calibration state in response to recognizing the first indication from the user while the wearable electronic device is in the standby state; while the wearable electronic device is in the calibration state: detecting second indication from the user by the wearable electronic device; recognizing the second indication from the user by the processor; and calibrating the sensor signal processing instructions by the processor in response to recognizing the second indication from the user; and entering the wearable electronic device into an active state in response to calibrating the sensor signal processing instructions while the wearable electronic device is in the calibration state; and while the wearable electronic device is in the active state: detecting at least one input by the at least one sensor; and executing the calibrated sensor signal processing instructions by the processor, wherein executing the calibrated sensor signal processing instructions causes the processor to process the at least one input based on the calibration of the sensor signal processing instructions from the calibration state.

The at least one sensor may be responsive to at least one gesture performed by the user and may provide sensor signals in response to the at least one gesture. The processor-executable sensor signal processing instructions may include processor-executable gesture identification instructions, and: entering the wearable electronic device into a standby state in response to a determination that the sensor signal processing instructions are not calibrated may include entering the wearable electronic device into a standby state in response to a determination that the gesture identification instructions are not calibrated; while the wearable electronic device is in the standby state, detecting a first indication from the user by the wearable electronic device, the first indication from the user indicative that the user is ready to calibrate the sensor signal processing instructions may include detecting a first indication from the user by the wearable electronic device, the first indication from the user indicative that the user is ready to calibrate the gesture identification instructions; while the wearable electronic device is in the calibration state, calibrating the sensor signal processing gesture identification instructions by the processor in response to recognizing the second indication from the user may include calibrating the gesture identification instructions by the processor in response to recognizing the second indication from the user; entering the wearable electronic device into an active state in response to calibrating the sensor signal processing instructions while the wearable electronic device is in the calibration state may include entering the wearable electronic device into an active state in response to calibrating the gesture identification instructions while the wearable electronic device is in the calibration state; while the wearable electronic device is in the active state, detecting at least one input by the at least one sensor may include detecting at least one gesture by the at least one sensor; and while the wearable electronic device is in the active state, executing the calibrated sensor signal processing gesture identification instructions by the processor may include executing the calibrated gesture identification instructions, wherein executing the calibrated gesture identification instructions causes the processor to identify the at least one gesture based on the calibration of the gesture identification instructions from the calibration state.

While the wearable electronic device is in the standby state: detecting a first indication from the user by the wearable electronic device may include detecting, by the at least one sensor, a rest gesture performed by the user; and recognizing the first indication from the user by the processor may include recognizing the rest gesture by the processor.

While the wearable electronic device is in the standby state: detecting a first indication from the user by the wearable electronic device may include detecting, by the wearable electronic device, when the user dons the wearable electronic device; and recognizing the first indication from the user by the processor may include recognizing, by the processor, when the user dons the wearable electronic device.

While the wearable electronic device is in the calibration state: detecting a second indication from the user by the wearable electronic device may include detecting, by the at least one sensor, a reference gesture performed by the user; recognizing the second indication from the user by the processor may include recognizing the reference gesture by the processor; and calibrating the gesture identification instructions by the processor in response to recognizing the second indication from the user may include calibrating the gesture identification instructions by the processor based on the reference gesture.

The at least one sensor may include at least one muscle activity sensor selected from the group consisting of: an electromyography ("EMG") sensor and a mechanomyography ("MMG") sensor. While the wearable electronic device is in the active state, detecting at least one gesture by the at least one sensor may include detecting muscle activity by the at least one muscle activity sensor when the user performs the at least one gesture.

The at least one sensor may include at least one inertial sensor selected from the group consisting of: an inertial measurement unit, an accelerometer, and a gyroscope. While the wearable electronic device is in the active state, detecting at least one gesture by the at least one sensor may include detecting motion of the wearable electronic device by the at least one inertial sensor when the user performs the at least one gesture.

The wearable electronic device may include at least one light-emitting diode ("LED") communicatively coupled to the processor, and wherein the method may further include at least one of: activating a first color of the at least one LED by the processor in response to entering the standby state; activating a second color of the at least one LED by the processor in response to entering the calibration state; and/or activating a third color of the at least one LED by the processor in response to entering the active state.

The wearable electronic device may include a haptic feedback device communicatively coupled to the processor, and the method may further include at least one of: activating the haptic feedback device by the processor in response to entering the standby state; activating the haptic feedback device by the processor in response to entering the calibration state; and/or activating the haptic feedback device by the processor in response to entering the active state.

The non-transitory processor-readable storage medium may store processor-executable state determination instructions that, when executed by the processor, cause the wearable electronic device to enter into and transition between the standby state, the calibration state, and the active state.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular portable electronic devices such as wearable electronic devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Wearable electronic devices enable a user to access electronically-implemented functions while the user's hands are otherwise engaged with something else. However, this feature can make it particularly challenging for the user to quickly (re-)establish normal operation of a wearable electronic device upon initial start-up and/or if the device encounters an operational error, malfunctions, or crashes. The various embodiments described herein provide systems, devices, and methods for automating the operation of a wearable electronic device by implementing the wearable electronic device as a state machine. Such automation may include, for example, automatic recovery of the device in the event that an operational error, malfunction, or crash is encountered.

A detailed description of an exemplary wearable electronic device implemented as a state machine in accordance with the present systems, devices, and methods is now provided. The particular exemplary wearable electronic device described below is provided for illustrative purposes only and a person of skill in the art will appreciate that the teachings herein may be applied with or otherwise incorporated into other forms of wearable electronic devices.

Figure 1:
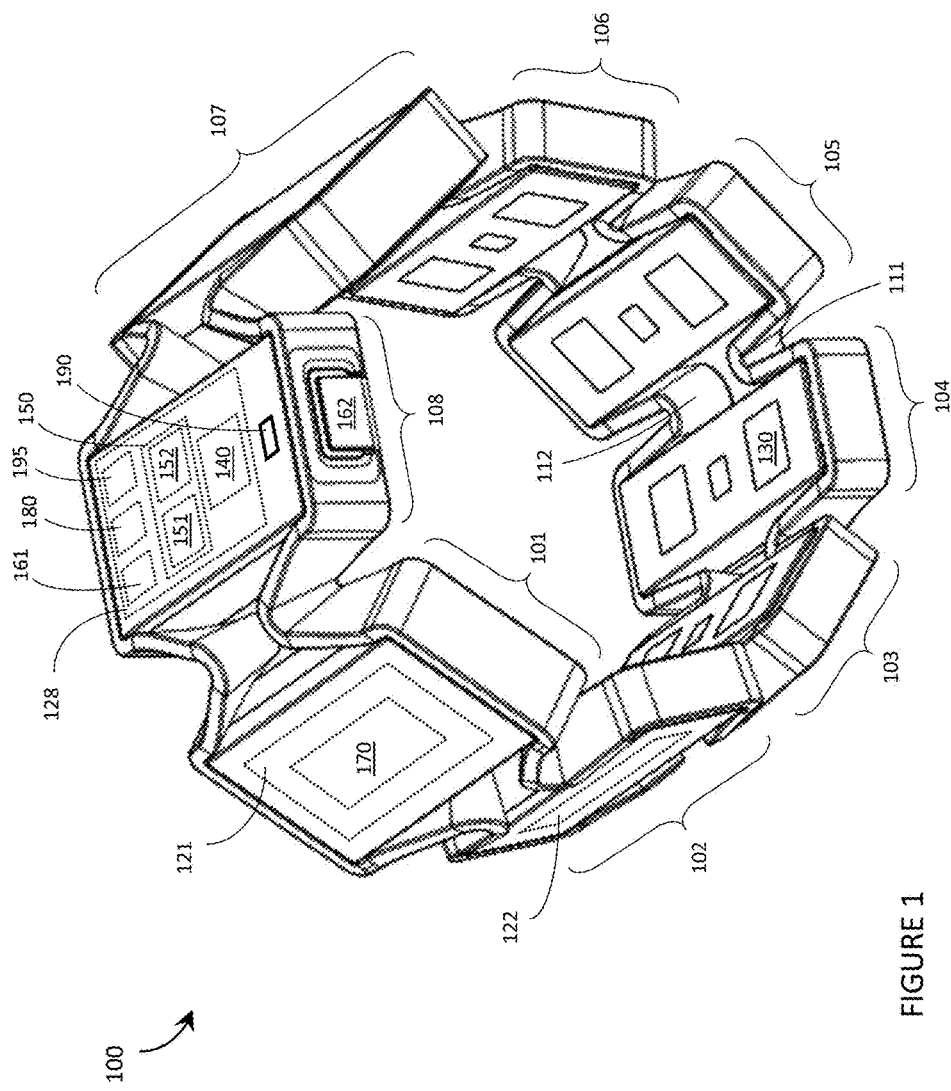
FIG. 1 is a perspective view of a wearable electronic device that operates as a state machine in accordance with the present systems, devices, and methods.

FIG. 1 is a perspective view of an exemplary wearable electronic device 100 that operates according to a state machine model in accordance with the present systems, devices, and methods. Exemplary wearable electronic device 100 may, for example, form part of a human-electronics interface. Exemplary wearable electronic device 100 is an armband designed to be worn on the forearm of a user, though a person of skill in the art will appreciate that the teachings described herein may readily be applied in wearable electronic devices designed to be worn elsewhere on the body of the user, including without limitation: on the upper arm, wrist, hand, finger, leg, foot, torso, or neck of the user, and/or in non-wearable electronic devices.

Wearable electronic device 100 includes a set of eight pod structures 101, 102, 103, 104, 105, 106, 107, and 108 that form physically coupled links thereof. Each pod structure in the set of eight pod structures 101, 102, 103, 104, 105, 106, 107, and 108 is positioned adjacent at least one other pod structure in the set of pod structures at least approximately on a perimeter of wearable electronic device 100. More specifically, each pod structure in the set of eight pod structures 101, 102, 103, 104, 105, 106, 107, and 108 is positioned adjacent and in between two other pod structures in the set of eight pod structures such that the set of pod structures forms a circumference or perimeter of an annular or closed loop (e.g., closed surface) configuration. For example, pod structure 101 is positioned adjacent and in between pod structures 102 and 108 at least approximately on a circumference or perimeter of the annular or closed loop configuration of pod structures, pod structure 102 is positioned adjacent and in between pod structures 101 and 103 at least approximately on the circumference or perimeter of the annular or closed loop configuration, pod structure 103 is positioned adjacent and in between pod structures 102 and 104 at least approximately on the circumference or perimeter of the annular or closed loop configuration, and so on. Each of pod structures 101, 102, 103, 104, 105, 106, 107, and 108 is both electrically conductively coupled and adaptively physically coupled over, through, or to the two adjacent pod structures by at least one adaptive coupler 111, 112. For example, pod structure 101 is adaptively physically coupled to both pod structure 108 and pod structure 102 by adaptive couplers 111 and 112. Further details of exemplary adaptive physical coupling mechanisms that may be employed in wearable electronic device 100 are described in, for example: U.S. Provisional Patent Application Ser. No. 61/857,105 (now US Patent Publication US 2015-0025355 A1); U.S. Provisional Patent Application Ser. No. 61/860,063 and U.S. Provisional Patent Application Ser. No. 61/822,740 (now combined in US Patent Publication US 2014-0334083 A1); and U.S. Provisional Patent Application Ser. No. 61/940,048 (now U.S. Non-Provisional patent application Ser. No. 14/621,044), each of which is incorporated by reference herein in its entirety. Device 100 is depicted in FIG. 1 with two adaptive couplers 111, 112, each positioned at least approximately on the circumference of wearable electronic device 100 and each providing both serial electrically conductive coupling and serial adaptive physical coupling between all of the pod structures in the set of eight pod structures 101, 102, 103, 104, 105, 106, 107, and 108.

Throughout this specification and the appended claims, the term "pod structure" is used to refer to an individual link, segment, pod, section, structure, component, etc. of a wearable electronic device. For the purposes of the present systems, devices, and methods, an "individual link, segment, pod, section, structure, component, etc." (i.e., a "pod structure") of a wearable electronic device is characterized by its ability to be moved or displaced relative to another link, segment, pod, section, structure component, etc. of the wearable electronic device. For example, pod structures 101 and 102 of device 100 can each be moved or displaced relative to one another within the constraints imposed by the adaptive couplers 111, 112 providing adaptive physical coupling therebetween. The desire for pod structures 101 and 102 to be movable/displaceable relative to one another specifically arises because device 100 is a wearable electronic device that advantageously accommodates the movements of a user and/or different user forms (e.g., sizes and/or shapes of limbs, or location of placement on limb).

Device 100 includes eight pod structures 101, 102, 103, 104, 105, 106, 107, and 108 that form physically coupled links thereof. The number of pod structures included in a wearable electronic device is dependent on at least the nature, function(s), and design of the wearable electronic device, and the present systems, devices, and methods may be applied to any wearable electronic device employing any number of pod structures, including wearable electronic devices employing more than eight pod structures and wearable electronic devices employing fewer than eight pod structures (e.g., at least two pod structures, such as three or more pod structures).

Wearable electronic devices employing pod structures (e.g., device 100) are used herein as exemplary wearable electronic device designs, while the present systems, devices, and methods may be applied to wearable electronic devices that do not employ pod structures (or that employ any number of pod structures). Thus, throughout this specification, descriptions relating to pod structures (e.g., functions and/or components of pod structures) should be interpreted as being generally applicable to functionally-similar configurations in any wearable electronic device design, even wearable electronic device designs that do not employ pod structures (except in cases where a pod structure is specifically recited in a claim).

In exemplary device 100 of FIG. 1, each of pod structures 101, 102, 103, 104, 105, 106, 107, and 108 comprises a respective housing having a respective inner volume. Each housing may be formed of substantially rigid material and may be optically opaque. Throughout this specification and the appended claims, the term "rigid" as in, for example, "substantially rigid material," is used to describe a material that has an inherent resiliency, i.e., a tendency to maintain or restore its shape and resist malformation/deformation under the moderate stresses and strains typically encountered by a wearable electronic device.

Details of the components contained within the housings (i.e., within the inner volumes of the housings) of pod structures 101, 102, 103, 104, 105, 106, 107, and 108 are not visible in FIG. 1. To facilitate descriptions of exemplary device 100, some internal components are depicted by dashed lines in FIG. 1 to indicate that these components are contained in the inner volume(s) of housings and may not normally be actually visible in the view depicted in FIG. 1, unless a transparent or translucent material is employed to form the housings. For example, any or all of pod structures 101, 102, 103, 104, 105, 106, 107, and/or 108 may include circuitry (i.e., electrical and/or electronic circuitry). In FIG. 1, a first pod structure 101 is shown containing circuitry 121 (i.e., circuitry 121 is contained in the inner volume of the housing of pod structure 101), a second pod structure 102 is shown containing circuitry 122, and a third pod structure 108 is shown containing circuitry 128. The circuitry in any or all pod structures may be communicatively coupled over, through, or to the circuitry in at least one adjacent pod structure by at least one respective internal wire-based connection. Communicative coupling over, through, or between circuitries of pod structures in device 100 may advantageously include systems, devices, and methods for stretchable printed circuit boards as described in U.S. Provisional Patent Application Ser. No. 61/872,569 (now US Patent Publication US 2015-0065840 A1) and/or systems, devices, and methods for signal routing as described in U.S. Provisional Patent Application Ser. No. 61/866,960 (now US Patent Publication US 2015-0051470 A1), both of which are incorporated by reference herein in their entirety.

Each individual pod structure within a wearable electronic device may perform a particular function, or particular functions. For example, in device 100, each of pod structures 101, 102, 103, 104, 105, 106, and 107 includes a respective sensor 130 (only one called out in FIG. 1 to reduce clutter) responsive to (i.e., to detect or sense) inputs effected by the user. In the specific example of device 100, sensors 130 are each responsive to signals when a user performs a physical gesture and, in response to a gesture, may each provide electrical signals (i.e., "sensor signals"). Thus, each of pod structures 101, 102, 103, 104, 105, 106, and 107 may be referred to as a respective "sensor pod." Throughout this specification and the appended claims, the term "sensor pod" is used to denote an individual pod structure that includes at least one sensor responsive to (i.e., to detect or sense) at least one input effected by (e.g., at least one gesture performed by) a user. Each of sensors 130 may be any type of sensor that is capable of detecting an input effected by a user, such as a button, a microphone, or a sensor operative to detect physical gestures. In the case of detecting physical gestures, each of sensors 130 may be any kind of sensor that is capable of detecting a signal produced, generated, or otherwise effected by the user in the performance of a gesture, including but not limited to: an electromyography sensor, a magnetomyography sensor, a mechanomyography sensor, a blood pressure sensor, a heart rate sensor, a gyroscope, an accelerometer, a compass, and/or a thermometer. In exemplary device 100, each of sensors 130 includes a respective electromyography ("EMG") sensor responsive to (i.e., to detect or sense) signals from the user in the form of electrical signals produced by muscle activity when the user performs a physical gesture. Wearable electronic device 100 may transmit information based on the detected signals to one or more receiving device(s) as part of a human-electronics interface (e.g., a human-computer interface). Further details of exemplary electromyography device 100 are described in at least U.S. patent application Ser. No. 14/186,878 (now US Patent Publication US 2014-0240223 A1), U.S. patent application Ser. No. 14/186,889 (now US Patent Publication US 2014-0240103 A1), U.S. patent application Ser. No. 14/194,252 (now US Patent Publication US 2014-0249397 A1), U.S. Provisional Patent Application Ser. No. 61/869,526 (now US Patent Publication US 2015-0057770 A1), U.S. Provisional Patent Application Ser. No. 61/909,786 (now U.S. Non-Provisional patent application Ser. No. 14/553,657), and U.S. Provisional Patent Application Ser. No. 61/954,379 (now U.S. Non-Provisional patent application Ser. No. 14/658,552), each of which is incorporated herein by reference in its entirety. Those of skill in the art will appreciate, however, that a wearable electronic device having electromyography functionality is used only as an example in the present systems, devices, and methods and that the systems, devices and methods for other forms of wearable electronic devices may similarly implement or incorporate the teachings herein.

Pod structure 108 of device 100 includes a processor 140 that processes the "sensor signals" provided by the EMG sensors 130 of sensor pods 101, 102, 103, 104, 105, 106, and 107 in response to detected muscle activity. Pod structure 108 may therefore be referred to as a "processor pod." Throughout this specification and the appended claims, the term "processor pod" is used to denote an individual pod structure that includes at least one processor to process sensor signals. The processor may be any type of processor, including but not limited to: a digital microprocessor or microcontroller, an application-specific integrated circuit (ASIC), a field-programmable gate array (FPGA), a digital signal processor (DSP), a graphics processing unit (GPU), a programmable gate array (PGA), a programmable logic unit (PLU), or the like, that analyzes or otherwise processes the signals to determine at least one output, action, or function based on the signals. Implementations that employ a digital processor (e.g., a digital microprocessor or microcontroller, a DSP) may advantageously include a non-transitory processor-readable storage medium or memory 150 communicatively coupled thereto and storing processor-executable instructions that control the operations thereof, whereas implementations that employ an ASIC, FPGA, or analog processor may or may not include a non-transitory processor-readable storage medium 150.

As used throughout this specification and the appended claims, the terms "sensor pod" and "processor pod" are not necessarily exclusive. A single pod structure may satisfy the definitions of both a "sensor pod" and a "processor pod" and may be referred to as either type of pod structure. For greater clarity, the term "sensor pod" is used to refer to any pod structure that includes a sensor and performs at least the function(s) of a sensor pod, and the term processor pod is used to refer to any pod structure that includes a processor and performs at least the function(s) of a processor pod. In device 100, processor pod 108 includes an EMG sensor 130 (not visible in FIG. 1) responsive to (i.e., to sense, measure, transduce or otherwise detect) muscle activity of a user, so processor pod 108 could be referred to as a sensor pod. However, in exemplary device 100, processor pod 108 is the only pod structure that includes a processor 140, thus processor pod 108 is the only pod structure in exemplary device 100 that can be referred to as a processor pod. The processor 140 in processor pod 108 also processes the sensor signals provided by the EMG sensor 130 of processor pod 108. In alternative embodiments of device 100, multiple pod structures may include processors, and thus multiple pod structures may serve as processor pods. Similarly, some pod structures may not include sensors, and/or some sensors and/or processors may be laid out in other configurations that do not involve pod structures.

In device 100, processor 140 includes and/or is communicatively coupled to a non-transitory processor-readable storage medium or memory 150. As described in more detail later on, memory 150 stores, at least, processor-executable state determination instructions 151 that, when executed by processor 140, cause wearable electronic device 100 to implement a state machine model by entering into and transitioning between various operational states, and processor-executable sensor signal processing instructions 152 that, when executed by processor 140, cause processor 140 to process at least one input effected by the user based on one or more sensor signal(s) provided by sensor(s) 130/180. In the specific example of device 100, processor-executable sensor signal processing instructions 152 include processor-executable gesture identification instructions 152 that, when executed by processor 140, cause processor 140 to identify one or more gesture(s) performed by the user based on incoming sensor signals. For communicating with a separate electronic device (not shown), wearable electronic device 100 includes at least one communication terminal. Throughout this specification and the appended claims, the term "communication terminal" is generally used to refer to any physical structure that provides a telecommunications link through which a data signal may enter and/or leave a device. A communication terminal represents the end (or "terminus") of communicative signal transfer within a device and the beginning of communicative signal transfer to/from an external device (or external devices). As examples, device 100 includes a first communication terminal 161 and a second communication terminal 162. First communication terminal 161 includes a wireless transmitter, wireless receiver, wireless transceiver or radio (i.e., a wireless communication terminal) and second communication terminal 162 includes a tethered connector port 162. Wireless transmitter 161 may include, for example, a Bluetooth® transmitter (or similar) or radio and connector port 162 may include a Universal Serial Bus port, a mini-Universal Serial Bus port, a micro-Universal Serial Bus port, a SMA port, a THUNDERBOLT® port, or the like. Either in addition to or instead of serving as a communication terminal, connector port 162 may provide an electrical terminal for charging one or more batteries 170 in device 100.

For some applications, device 100 may include at least one inertial sensor 180 (e.g., an inertial measurement unit, or "IMU," that includes at least one accelerometer and/or at least one gyroscope) responsive to (i.e., to detect, sense, or measure) motion effected by a user and provide signals (i.e., sensor signals) in response to the detected motion. The motion may correspond to a physical gesture performed by the user. Sensor signals provided by inertial sensor 180 may be combined or otherwise processed in conjunction with sensor signals provided by EMG sensors 130.

Throughout this specification and the appended claims, the term "provide" and variants such as "provided" and "providing" are frequently used in the context of signals. For example, an EMG sensor is described as "providing at least one signal" and an inertial sensor is described as "providing at least one signal." Unless the specific context requires otherwise, the term "provide" is used in a most general sense to cover any form of providing a signal, including but not limited to: relaying a signal, outputting a signal, generating a signal, routing a signal, creating a signal, transducing a signal, and so on. For example, a surface EMG sensor may include at least one electrode that resistively or capacitively couples to electrical signals from muscle activity. This coupling induces a change in a charge or electrical potential of the at least one electrode which is then relayed through the sensor circuitry and output, or "provided," by the sensor. Thus, the surface EMG sensor may "provide" an electrical sensor signal by relaying an electrical signal from a muscle (or muscles) to an output (or outputs). In contrast, an inertial sensor may include components (e.g., piezoelectric, piezoresistive, capacitive, etc.) that are used to convert physical motion into electrical signals. The inertial sensor may "provide" an electrical sensor signal by detecting motion and generating an electrical signal in response to the motion.

As previously described, each of pod structures 101, 102, 103, 104, 105, 106, 107, and 108 may include circuitry (i.e., electrical and/or electronic circuitry). FIG. 1 depicts circuitry 121 inside the inner volume of sensor pod 101, circuitry 122 inside the inner volume of sensor pod 102, and circuitry 128 inside the inner volume of processor pod 108. The circuitry in any or all of pod structures 101, 102, 103, 104, 105, 106, 107 and 108 (including circuitries 121, 122, and 128) may include any or all of: an amplification circuit to amplify electrical sensor signals provided by at least one EMG sensor 130, a filtering circuit to remove unwanted signal frequencies from the sensor signals provided by at least one EMG sensor 130, and/or an analog-to-digital conversion circuit to convert analog sensor signals into digital sensor signals.

Sensor signals that are provided by EMG sensors 130 in device 100 are routed to processor pod 108 for processing by processor 140. To this end, device 100 employs a set of wire-based communicative pathways (within adaptive couplers 111 and 112; not visible in FIG. 1) to route the signals that are output by sensor pods 101, 102, 103, 104, 105, 106, and 107 to processor pod 108. Each respective pod structure 101, 102, 103, 104, 105, 106, 107, and 108 in device 100 is communicatively coupled over, through, or to at least one of the two other pod structures between which the respective pod structure is positioned by at least one respective wire-based communicative pathway.

The use of "adaptive couplers" is an example of an implementation of an armband in accordance with the present systems, devices, and methods. More generally, device 100 comprises a band that in use is worn on an arm of the user, where the at least one sensor 130 and/or 180, the processor 140, and the non-transitory processor-readable storage medium 150 are all carried by the band.

As will be described in more detail later, device 100 also includes at least one light-emitting diode ("LED") 190 and a haptic feedback device 195, each communicatively coupled to the processor 140 to, in use, provide feedback and/or indication(s) to the user about the current state of device 100 and/or about transitions between states of device 100.

Wearable electronic device 100 is an illustrative example of a wearable electronic device that implements a state machine model in accordance with the present systems, devices, and methods. To this end, device 100 is configured, adapted, or otherwise operable to carry out the method illustrated in FIG. 2.

Figure 2:
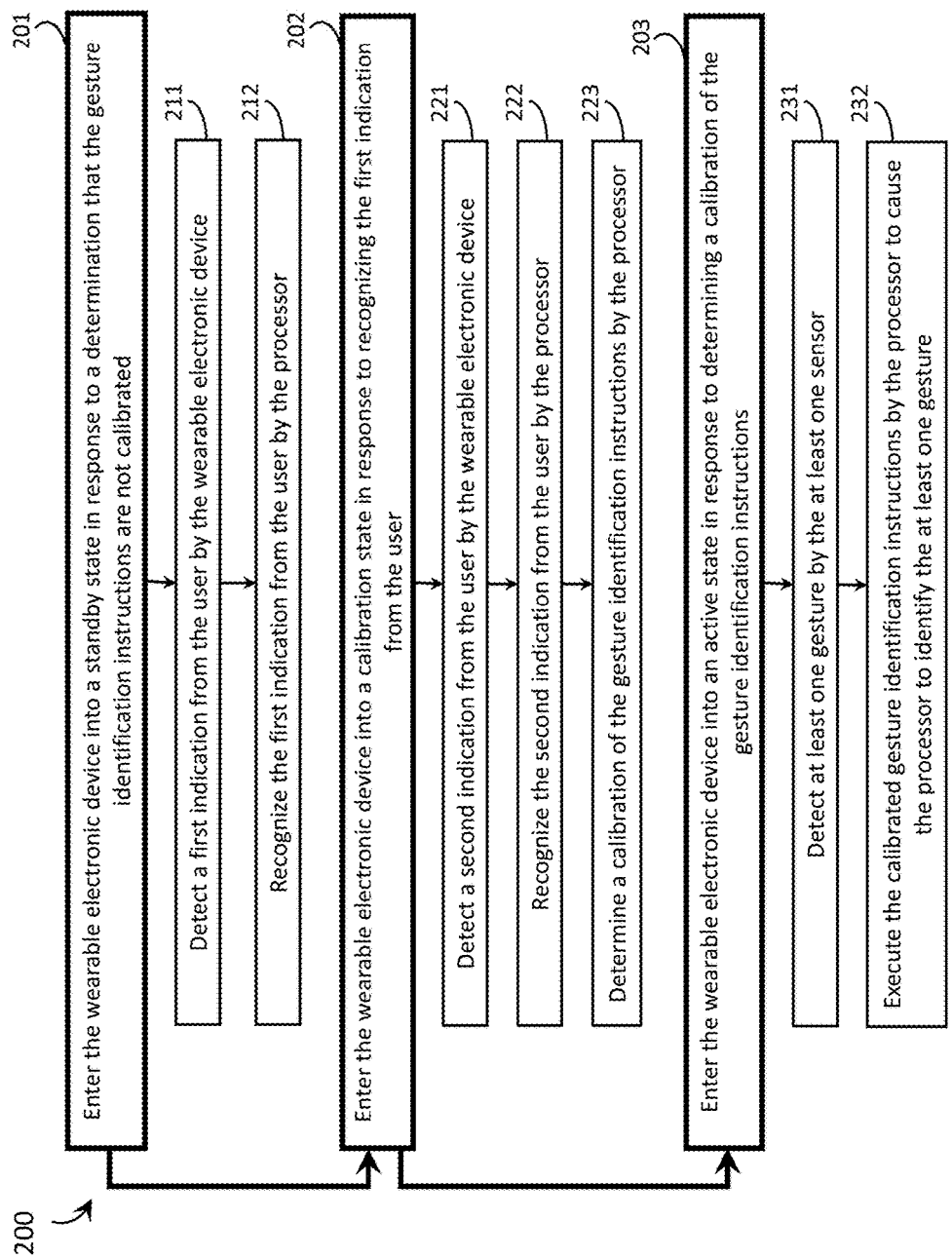
FIG. 2 is a flow-diagram showing a method of operating a wearable electronic device as a state machine in accordance with the present systems, devices, and methods.

FIG. 2 is a flow-diagram showing a method 200 of operating a wearable electronic device as a state machine in accordance with the present systems, devices, and methods. The wearable electronic device includes at least one sensor responsive to at least one input effected by (e.g., at least one gesture performed by) a user of the wearable electronic device, and in response to the at least one input the at least one sensor provides sensor signals. The wearable electronic device also includes a processor communicatively coupled to the at least one sensor as illustrated in the example of device 100 in FIG. 1 and a non-transitory processor-readable storage medium of memory communicatively coupled to the processor. The memory stores, at least, processor-executable sensor signal processing instructions (e.g., processor-executable gesture identification instructions) that, when executed by the processor, enable the wearable electronic device to identify one or more input(s) (e.g., gesture(s)) performed by the user based on the corresponding sensor signal(s) provided by the at least one sensor. For the description of method 200 (and throughout this specification), processor-executable gesture identification instructions are used as a specific, non-limiting example of processor-executable sensor signal processing instructions, though a person of skill in the art will appreciate that method 200 (and more generally, the teachings of the present systems, devices, and methods) may readily be adapted to accommodate other forms of processor-executable sensor signal processing instructions.

Method 200 includes three main acts 201, 202, and 203, each of which includes a respective set of sub-acts. Specifically, act 201 includes sub-acts 211 and 212, act 202 includes sub-acts 221, 222, and 223, and act 203 includes sub-acts 231 and 232. Those of skill in the art will appreciate that in alternative embodiments certain acts and/or sub-acts may be omitted and/or additional acts and/or sub-acts may be added. Those of skill in the art will also appreciate that the illustrated order of the acts and sub-acts is shown for exemplary purposes only and may change in alternative embodiments. To exemplify the relationship between the acts/sub-acts of method 200 and the elements of exemplary wearable electronic device 100, reference to elements of device 100 from FIG. 1 are included in parentheses throughout the description of method 200. However, a person of skill in the art will appreciate that method 200 may similarly be implemented using a different wearable electronic device other than device 100 from FIG. 1.

At 201, the wearable electronic device (100) enters into a standby state in response to a determination that the gesture identification instructions (152) (i.e., in relation to sensor signals provided by the at least one sensor 130 and/or 180) are not calibrated. The determination that the gesture identification instructions (152) are not calibrated may include a determination that the gesture identification instructions (152) have not yet been calibrated (e.g., the gesture identification instructions (152) have not been calibrated since the device was last turned on, or since the device was donned by the user) or a determination that the gesture identification instructions (152) are inoperable with, improperly configured for, or otherwise inconsistent with the incoming sensor signals. While the wearable electronic device (100) is in the standby state, sub-acts 211 and 212 are performed. At 211, a first indication or gesture from the user (e.g., a first user-performed gesture) is detected by the wearable electronic device (e.g., by the at least one sensor (130 and/or 180)) and at 212, the first indication or gesture is recognized by the processor (140). The determination that the gesture identification instructions (152) are not calibrated may be made, for example, by the processor (140). The first indication from the user may include the user putting on the wearable electronic device, or the first indication from the user may include a "rest gesture" performed by the user (i.e., the user relaxing and holding still, at rest, the portion of their body upon which the wearable electronic device is worn).

Throughout this specification and the appended claims, reference is often made to instructions (e.g., sensor signal processing instructions, such as gesture identification instructions (152)) being "calibrated" or "not calibrated." As used herein, the "calibration" of sensor signal processing instructions, such as gesture identification instructions (152), refers to the configuration and/or composition of sensor signal processing instructions (e.g., gesture identification instructions (152)) with respect to sensor signals provided by the at least one sensor (130 and/or 180) in response to user-effected inputs (e.g., user-performed gestures). For example, a "calibration" of gesture identification instructions (152) with respect to an accelerometer or gyroscope (e.g., IMU 180) sensor signal may include one or more reference point(s) to establish a directional bearing, such as a determination of which way is up or down. A calibration of gesture identification instructions (152) with respect to the sensor signals provided by the set of EMG sensors 130 in exemplary device 100 may include, for example, a determination of the positions of the EMG sensors (130) relative to the muscles in the arm of the user (i.e., a determination of the position and/or orientation of device 100 on the user's arm). As used herein, "calibrating sensor signal processing (e.g., gesture identification) instructions" (and similar variants) may involve tuning the sensor signals themselves (e.g., by modifying amplification, filtering, and/or other signal processing parameters, such as windowing parameters and the like) and/or may involve generally tuning the way in which the instructions (152) cause the wearable electronic device to understand and handle the sensor signals. For example, "calibrating gesture identification instructions" as used herein may include setting or adjusting one or more parameter(s) and/or variable(s) of the gesture identification instructions (152) so that, when executed by the processor (140), the gesture identification instructions (152) cause the processor to process the sensor signals based on the set or adjusted parameter(s) and/or variable(s).

As used herein, "calibrating sensor signal processing (e.g., gesture identification) instructions" with respect to or in relation to sensor signals generally means synchronizing or otherwise rendering compatible the sensor signal processing (e.g., gesture identification) instructions and the sensor signals.

A determination that the gesture identification instructions (152) are not calibrated may result from a variety of different scenarios. For example, the processor (140) may automatically determine, set, and/or treat the gesture identification instructions (152) as being not calibrated in response to the wearable electronic device (100) being first turned on, activated, initialized or booted up. As another example, the processor (140) may automatically determine that the gesture identification instructions (152) are not calibrated in response to detecting that the user has donned (i.e., put on) the wearable electronic device, or that the position and/or orientation at which the wearable electronic device (100) is worn by the user has or is being changed (including, for example, the device being removed and re-applied). As another example, the processor (140) may automatically determine that the gesture identification instructions (152) are not calibrated if execution of the gesture identification instructions (152) by the processor (140) causes the sensor signals to appear unstable and/or if processor (140) is not able to process the sensor signals, upon execution of the gesture identification instructions (152), to identify gestures performed by the user per act 232 of method 200 (discussed in more detail later on).

In method 200, the wearable electronic device (100) enters into the standby state per act 201 as a way to initialize or re-initialize the gesture identification instructions (152) in relation to the sensor signals and/or to confirm that the user is ready to calibrate the gesture identification instructions (152) by, for example, manually performing or executing a series of one or more indication(s), gesture(s) or action(s) which form a calibration routine or act. Accordingly, the first indication or gesture detected at sub-act 211 may advantageously be performed while the user is at rest and the sensor signals are not substantially evolving over time. As previously described, the first indication or gesture performed by the user while device 100 is in the standby state may be a rest gesture. For the purposes of the present systems, devices, and methods, a "rest gesture" may be generally defined as a period of inactivity and/or immobility of at least the portion of the user upon which the wearable electronic device (100) is worn. When the first indication or gesture from the user is a rest gesture, sub-act 211 may include detecting the rest gesture by the at least one sensor (130 and/or 180) and sub-act 212 may include recognizing the rest gesture by the processor (140). The rest gesture is just one example of a potential first indication from the user and other examples of the first indication from the user may be employed, including without limitation a determination that the user has activated or donned the wearable electronic device or receipt by the wearable electronic device of a signal (e.g., a wireless signal originating from a separate electronic device and received by a wireless transceiver 161 on-board wearable electronic device 100) indicating that the user has activated or launched another device, application, or program with which the wearable electronic device is operative to interact.

At 202, the wearable electronic device (100) enters into a calibration state in response to recognizing the first indication or gesture (e.g., the rest gesture, or the user donning the wearable electronic device) from the user while the wearable electronic device (100) is in the standby state. In other words, the wearable electronic device (100) transitions from the standby state to the calibration state in response to the first indication from the user while the gesture identification instructions (152) are not calibrated. While the wearable electronic device (100) is in the calibration state, sub-acts 221, 222, and 223 are performed. At 221, the wearable electronic device (100) detects a second indication or gesture from the user; at 222, the processor (140) recognizes the second indication or gesture from the user; and at 223, the processor (140) calibrates the gesture identification instructions (152) (e.g., in relation to the sensor signals the correspond to the second indication from the user) in response to recognizing the second indication or gesture from the user.

In the exemplary case where the wearable electronic device is an electromyography device 100 (or, more generally, a gesture-based control device), the at least a second indication or gesture from the user may include at least one reference gesture. In this scenario, sub-act 221 may include detecting a reference gesture by the at least one sensor (130 and/or 180); sub-act 222 may include recognizing the reference gesture by the processor (140); and sub-act 223 may include calibrating the gesture identification instructions (152) by the processor (140) based on the sensor signals that correspond to the reference gesture. A detailed example of calibrating the gesture identification instructions (152) by the processor (140) based on a single reference gesture is provided further herein.

At 203, the wearable electronic device (100) enters into an active state in response to calibrating the gesture identification instructions (152) while the wearable electronic device (100) is in the calibration state. In other words, the wearable electronic device (100) transitions from the calibration state to the active state in response to calibrating the gesture identification instructions (152) based on the sensor signals corresponding to a reference gesture performed by the user while the wearable electronic device (100) is in the calibration state. While the wearable electronic device (100) is in the active state, sub-acts 231 and 232 are performed. At 231, at least one additional gesture performed by the user is detected by the at least one sensor (130 and/or 180) and at 232, the at least one additional gesture is identified by the processor (140) based on the calibration of the gesture identification instructions (152) from sub-act 223. During the active state, the processor (140) may employ various techniques and/or algorithms to identify user-performed gestures, including without limitation, the techniques and algorithms described in: U.S. Provisional Patent Application Ser. No. 61/881,064 (now U.S. Non-Provisional patent application Ser. No. 14/494,274); U.S. Provisional Patent Application Ser. No. 61/894,263 (now U.S. Non-Provisional patent application Ser. No. 14/520,081); and/or U.S. Provisional Patent Application Ser. No. 61/915,338 (now U.S. Non-Provisional patent application Ser. No. 14/567,826); each of which is incorporated by reference herein in its entirety.

As previously described, the wearable electronic device (100) may include a non-transitory processor-readable storage medium (150) communicatively coupled to the processor (140), and the non-transitory processor-readable storage medium (150) may store processor-executable state determination instructions (151) that, when executed by the processor (140), cause the wearable electronic device (100) to enter into and transition between the standby state (per act 201), the calibration state (per act 202), and the active state (per act 203). In other words, the state determination instructions (151) implement a state machine model. The non-transitory processor-readable memory (150) may also include processor-executable instructions that, when executed by the processor (140), cause the wearable electronic device (100) to implement the various states of the wearable electronic device (100), such as "standby state implementation instructions" that cause the wearable electronic device (100) to perform sub-acts 211 and 212, "calibration state implementation instructions" that cause the wearable electronic device (100) to perform sub-acts 221, 222, and 223, and "active state implementation instructions" that cause the wearable electronic device (100) to perform sub-acts 231 and 232. For example, when executed by the processor (140), the processor-executable instructions may cause the processor (140) to recognize when the user dons the wearable electronic device (100) or launches a compatible application as the first indication or gesture from the user in the standby state per sub-act 212 (the rest gesture indicative that the user is ready to calibrate the gesture identification instructions (152)) and/or recognize a reference gesture as the second indication or gesture from the user in the calibration state per sub-act 222 and/or calibrate the gesture identification instructions (152) based on the sensor signals that correspond to the reference gesture per sub-act 223.

As described in the illustrative example of device 100, the at least one sensor of the wearable electronic device may include at least one muscle activity sensor (130), such as at least one EMG sensor and/or at least one mechanomyography (MMG) sensor. In this case: while the wearable electronic device (100) is in the standby state per act 201, detecting a first indication from the user by the wearable electronic device (100) may include detecting muscle activity by the at least one muscle activity sensor (130) when the user performs or provides the first indication; while the wearable electronic device (100) is in the calibration state per act 202, detecting a second indication from the user by the wearable electronic device (100) may include detecting muscle activity by the at least one muscle activity sensor (130) when the user performs or provides the second indication; and while the wearable electronic device (100) is in the active state per act 203, detecting at least one gesture by the at least one sensor may include detecting muscle activity by the at least one muscle activity sensor (130) when the user performs the at least one gesture.

Either in addition to or instead of at least one muscle activity sensor (130), the at least one sensor may include at least one inertial sensor (180) such as an IMU, an accelerometer, and/or a gyroscope. In this case: while the wearable electronic device (100) is in the standby state per act 201, detecting a first indication from the user by the wearable electronic device (100) includes detecting motion of the wearable electronic device (100) by the at least one inertial sensor (180) when the user performs or provides the first indication; while the wearable electronic device (100) is in the calibration state per act 202, detecting a second indication from the user by the wearable electronic device (100) includes detecting motion of the wearable electronic device (100) by the at least one inertial sensor (180) when the user performs or provides the second indication; and while the wearable electronic device (100) is in the active state per act 203, detecting at least one gesture by the at least one sensor includes detecting motion of the wearable electronic device (100) by the at least one inertial sensor (180) when the user performs the at least one gesture.

As also described in the illustrative example of FIG. 1, the wearable electronic device may include at least one mechanism for providing feedback to the user, such as at least one LED 190 and/or a haptic feedback device 195. In accordance with the present systems, devices, and methods, a haptic feedback device 195 may include a vibratory electric motor, piezoelectric component, solenoid, and/or other actuator. In the case of at least one LED 190, a first color of the at least one LED 190 may be activated (e.g., by the processor (140) in accordance with processor-executable instructions stored in memory (150)) in response to entering the standby state per act 201; a second color of the at least one LED 190 may be activated in response to entering the calibration state per act 202; and/or a third color of the at least one LED 190 may be activated in response to entering the active state per act 203. In the case of a haptic feedback device 195, the haptic feedback device 195 may be activated (e.g., by the processor (140) in accordance with processor-executable instructions stored in memory (150)) in response to entering the standby state per act 201; the haptic feedback device 195 may be activated in response to entering the calibration state per act 202; and/or the haptic feedback device 195 may be activated in response to entering the active state per act 203.

A detailed example of calibrating the gesture identification instructions (152) by the processor 140 of exemplary device 100 per sub-act 223 is now described. In the example, the gesture identification instructions are calibrated based on the sensor signals corresponding to (i.e., provided by the at least one sensor in response to) a single reference gesture performed by the user; however, in alternative implementations multiple reference gestures and/or other indications from the user may be used to calibrate the sensor signals.

For device 100, calibrating the gesture identification instructions 152 may involve determining the position and/or orientation of the EMG sensors 130 relative to the muscles in the user's forearm. A feature of exemplary wearable EMG device 100 from FIG. 1 is that the order of the EMG sensors 130 around the perimeter of the device 100 is fixed. That is, each EMG sensor 130 is positioned adjacent and in between the same two other EMG sensors 130 regardless of the position and/or orientation of the device 100. Furthermore, the angular spacing between EMG sensors 130 remains substantially constant as described in U.S. Provisional Patent Application Ser. No. 61/860,063 (now US Patent Publication US 2014-0334083 A1), which is incorporated herein by reference in its entirety. Thus, assuming the device 100 is snugly fit on the forearm of the user, in order to determine the position and/or orientation of the EMG sensors 130 on the forearm of the user, only three things need to be determined by the processor 140: i) on which arm of the user is the device 100 being worn, ii) what is the rotational orientation of the device 100; and iii) what is the front-to-back orientation of the device 100? In accordance with the present systems, devices, and methods, having the user perform a single reference gesture can provide all of the information necessary to answer each of these three questions. For the example that follows, the device 100 includes an IMU 180 (such as an MPU-9150 Nine-Axis MEMS MotionTracking™ Device from InvenSense) that includes multi-axis accelerometers, gyroscopes, and a compass, and the reference gesture is: begin with the arm (i.e., the arm upon which the device is worn) extended out in front and with the hand forming a loose first with the thumb on top such that the back or dorsal side of the thumb faces upwards, then open the hand and bend the wrist outwards such that the open palm faces forwards and the extended fingers point outwards approaching ninety degrees to the forearm (i.e., as far past about forty-five degrees that is comfortable for the user). A person of skill in the art will appreciate that the combination of IMU and reference gesture data used in this example is not limiting and that many alternative reference gestures and/or motion-detecting devices may similarly be used.

i) On which Arm of the User is Device 100 being Worn?

The reference gesture used in this example causes a small change in the yaw of the wearable EMG device 100. As the user's wrist bends back outwardly, the user's forearm shifts slightly inward. This change in the yaw is determined from signals provided by the IMU 180 and indicates on which arm of the user the device 100 is being worn. For example, a negative change in yaw from the sensor's perspective may indicate that the device 100 is worn on the right arm of the user while a positive change in the yaw may indicate that the device 100 is worn on the left arm of the user. Yaw calculation from accelerometer, gyroscope, and/or compass data can employ any number of techniques including without limitation: sensor fusion algorithms, quaternion-based methods, and the like.

ii) What is the Rotational Orientation of Device 100?

The rotational orientation of device 100 influences which EMG sensors 130 overlie and/or are most proximate to which specific muscle groups in the user's forearm. While device 100 is worn on a forearm of the user, the rotational orientation may be changed by, for example: a) holding device 100 fixed in space with the user's other hand and rotating, twisting, or pronating the forearm upon which the device 100 is worn about the longitudinal axis of the forearm (e.g., from a palm facing up position to a palm facing down position), or b) holding the forearm upon which the device 100 is worn fixed in space and using the other hand to spin the device 100 about the longitudinal axis of the fixed forearm. When the user performs the reference gesture, two adjacent EMG sensors 130 of device 100 detect coincident spikes in muscle activity corresponding to activation of the muscles on the outside or posterior side of the user's arm (e.g., the extensor digitorum, the extensor digiti minimi, and/or the extensor carpi ulnaris). Thus, the rotational orientation of device 100 is determined to be either one of two rotational orientations that place the two spiking EMG sensors 130 proximate the active muscles. The two rotational orientations are distinguished by the front-to-back orientation of device 100 (i.e., the two rotational orientations are front-to-back variants of one another).

iii) What is the Front-to-Back Orientation of Device 100?

The front-to-back orientation of device 100 is established by the side through which the user's hand enters the opening of the closed loop configuration of device 100. For example, in a first front-to-back orientation tethered connector-port 162 of device 100 faces proximally towards the user's elbow and in a second front-to-back orientation tethered connector port 162 faces distally towards the user's hand. When the user performs the reference gesture, the front-to-back orientation of device 100 is determined by the absolute roll of device 100, which is detected by IMU 180. Roll calculation from accelerometer, gyroscope, and/or compass data may employ any of a variety of techniques including without limitation: sensor fusion algorithms, quaternion-based methods, and the like.

Once the arm, rotational orientation, and front-to-back orientation of wearable electronic device 100 are established, processor 140 may calibrate gesture identification instructions 152 by encoding gesture identification instructions 152 with information about the arm, rotational orientation, and front-to-back orientation of device 100. For example, processor 140 may assign value(s) to certain parameter(s) and/or variable(s) in gesture identification instructions 152 that represent the arm, rotational orientation, and front-to-back orientation of device 100. Calibrating gesture identification instructions 152 may generally involve encoding a mapping between sensor signal channel (i.e., specific ones of sensors 130 corresponding to respective ones of pods 101, 102, 103, 104, 105, 106, 107, and 108) and approximate location of the corresponding sensor 130 on the user's arm based on a determination of the arm, rotational orientation, and front-to-back orientation of device 100.

As previously described, state determination instructions 151 stored in the non-transitory processor-readable storage medium 150 of device 100 implement a state machine model. Exemplary elements of this model, and exemplary relationships therebetween, are pictorially depicted in FIG. 3.

Figure 3:
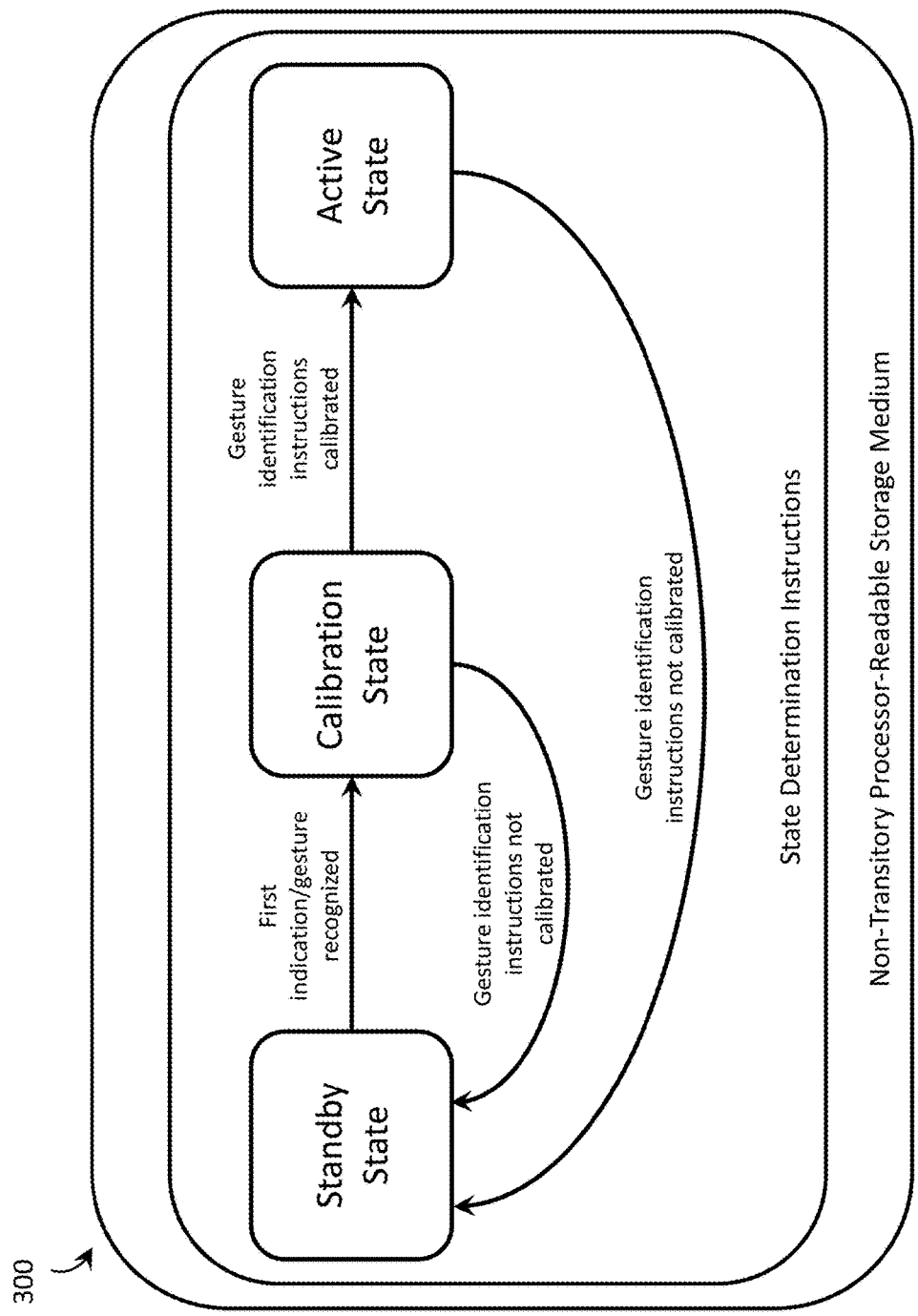
FIG. 3 is an illustrative diagram of a non-transitory processor-readable storage medium carried on-board a wearable electronic device and storing state determination instructions, shown as a state transition diagram, in accordance with the present systems, devices, and methods.

FIG. 3 is an illustrative diagram of a non-transitory processor-readable storage medium (150) carried on-board a wearable electronic device (100; not illustrated in the Figure) and state determination instructions (151) or other logic (e.g., hardwired circuitry that does not execute instructions) that implement a state machine model in accordance with the present systems, devices, and methods. The state determination instructions (151) are processor-executable instructions that, when executed by the processor (140) of the wearable electronic device (100), cause the wearable electronic device (100) to enter into and transition between a set of operational states. For illustrative purposes, the state determination instructions (151) are shown in the form of a state transition diagram in FIG. 3. The operational states include, at least: a standby state, a calibration state, and an active state. The arrows in FIG. 3 depict the relationships (i.e., the directions of transition) between these states.

The illustrative diagram of FIG. 3 represents the state transitions described in method 200 with a state transition diagram. To exemplify the relationship between the elements of FIG. 3 and the acts/sub-acts of method 200, reference to the acts/sub-acts of method 200 are included in parentheses throughout the description of FIG. 3. The state determination instructions cause the wearable electronic device to enter into the standby state (per act 201) in response to a determination that the gesture identification instructions are not calibrated.

The wearable electronic device may initialize in the standby state because the gesture identification instructions have not yet been calibrated, or it may enter into the standby state from either the calibration state or the active state if the gesture identification instructions become inconsistent with the current calibration (e.g., if the position/orientation of device 100 changes on the user's arm). While in the standby state, the processor of the wearable electronic device may, for example, monitor the sensor signals and recognize when the user performs or provides a first indication, such as a rest gesture, donning the wearable electronic device, or launching a compatible application on a separate electronic device in communication with the wearable electronic device.

The state determination instructions cause the wearable electronic device to transition from the standby state to the calibration state (per act 202) in response to recognizing that the user has performed or provided the first indication. While in the calibration state, the processor of the wearable electronic device may, for example, monitor the sensor signals and recognize when the user performs or provides a second indication, such as a reference gesture. The processor then calibrates the gesture identification instructions based on the sensor signal(s) provided by the at least one sensor in response to the reference gesture. If the second indication is not recognized before further sensor signals are received by the processor, then the state determination instructions may cause the processor to determine that the gesture identification instructions are not calibrated and transition back to the standby state (per act 201).

The state determination instructions cause the wearable electronic device to transition from the calibration state to the active state (per act 203) in response to calibrating the gesture identification instructions. While in the active state, the processor of the wearable electronic device identifies gestures performed by the user based on the current calibration of the gesture identification instructions. If the processor is unable to identify gestures from the sensor signals (upon execution of the calibrated gesture identification instructions) or recognizes that the user has changed the position/orientation of the device, then the processor may determine that the gesture identification instructions are not calibrated and the state determination instructions may cause the wearable electronic device to transition back to the standby state (per act 201).

In accordance with the present systems, device, and methods, implementing a wearable electronic device as a state machine enables the device to identify and automatically recover from operational errors, malfunctions, or crashes with minimal intervention from the user. The state machine models realized by method 200 and the illustrative diagram of FIG. 3 provide illustrative examples of achieving such automated recovery; however, the teachings described herein may be broadened or narrowed to encompass wearable electronic devices that implement state machine models having fewer, more, or different states from the illustrative examples described herein. For example, in some applications, it may be advantageous to decompose the "active state" described herein into at least two component states: an "unpaired state" and a "paired state." In an unpaired state, the processor may be ready to identify gestures performed by the user (by executing calibrated gesture identification instructions) per sub-act 232 but may not actually perform such identification until the processor recognizes that the wearable electronic device has paired with (e.g., through a wireless communication protocol such as Bluetooth® or through a wired connection) another device. Alternatively, the operation of the processor in the unpaired state may be substantially as described for the active state. In either case, the wearable electronic device may transition from the unpaired state to the paired state in response to a determination that the wearable electronic device has paired with another device. In the paired state, the operation of the processor may be substantially as described for the active state with the addition that in the paired state the processor may generate one or more signal(s) in response to identifying additional gestures and provide the one or more signals to a communication terminal (e.g., 161 or 162) for transmission to the paired receiving device. If the processor determines that the device is no longer paired with another device but the gesture identification instructions are still calibrated, then the wearable electronic device may transition from the paired state to the unpaired state. Either at least one LED (190) or a haptic feedback device (195), or both, may provide feedback to the user to indicate a transition between the unpaired state and the paired state.

In a similar way, it may be advantageous to decompose the "active state" described herein into a "controller-off state" and a "controller-on state." In a controller-off state, the processor may be ready to identify gestures performed by the user (by executing calibrated gesture identification instructions) per sub-act 232 but may not actually perform such identification until the processor recognizes that the wearable electronic device is in control of (e.g., through a wireless communication protocol such as Bluetooth® or through a wired connection) a software application running on another device. Alternatively, the operation of the processor in the controller-off state may be substantially as described for the active state. In either case, the wearable electronic device may transition from the controller-off state to the controller-on state in response to a determination that the wearable electronic device is in control of a software application running on another device. In the controller-on state, the operation of the processor may be substantially as described for the active state with the addition that in the controller-on state the processor may generate one or more signal(s) in response to identifying additional gestures and provide the one or more signals to a communication terminal (e.g., 161 or 162) for transmission to receiving device on-board the other device in order to effect one or more control(s) of the software application running on the other device. If the processor determines that the software application is no longer running on the other device but the gesture identification instructions are still calibrated, then the wearable electronic device may transition from the controller-on state to the controller-off state. Either at least one LED (190) or a haptic feedback device (195), or both, may provide feedback to the user to indicate a transition between the controller-off state and the controller-on state.

In some implementations, the operational states of a wearable electronic device may include a "sleep" state. In a sleep state, some or all of the components of the wearable electronic device may power down in order to conserve energy. For example, in a wearable electronic device that employs EMG sensors 130, the EMG sensors (e.g., the amplification circuits thereof) may be decoupled from electrical power and/or the processor may cease to process the EMG sensor signals. If such a wearable electronic device also includes an IMU, then the IMU may remain active in the sleep state and respond to motion of the wearable electronic device. Motion detected by the IMU may trigger the wearable electronic device out of the sleep state and, for example, into another state such as the standby state, the calibration state, or the active state (depending on a determination of whether or not the gesture identification instructions are calibrated). In some implementations, the state determination instructions may continually monitor the IMU sensor signals (regardless of the state of the wearable electronic device) and enter the wearable electronic device into a sleep state if a defined period of time (e.g., five seconds, ten seconds, thirty seconds) elapses with no motion of the wearable electronic device being detected by the IMU.

As an exemplary implementation, the "state" of a wearable electronic device can be stored in the non-transitory processor-readable storage medium (e.g., within the processor-executable state determination instructions) as a global variable which can dictate whether the processor monitors the sensor signals for stability, examines the sensor signals for a reference gesture, or applies a classification scheme to the sensor signals for the purpose of gesture identification.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. Provisional Patent Application Ser. No. 61/971,346; U.S. Provisional Patent Application Ser. No. 61/857,105 (now US Patent Publication US 2015-0025355 A1); U.S. Provisional Patent Application Ser. No. 61/860,063 and U.S. Provisional Patent Application Ser. No. 61/822,740 (now combined in US patent Publication Ser. No. 14/276,575); U.S. Provisional Patent Application Ser. No. 61/940,048 (now U.S. Non-Provisional patent application Ser. No. 14/621,044); U.S. Provisional Patent Application Ser. No. 61/872,569 (now US Patent Publication US 2015-0065840 A1); U.S. Provisional Patent Application Ser. No. 61/866,960 (now US Patent Publication US 2015-0051470 A1); U.S. patent application Ser. No. 14/186,878 (now US Patent Publication US 2014-0240223 A1); U.S. patent application Ser. No. 14/186,889 (now US Patent Publication US 2014-0240103 A1); U.S. patent application Ser. No. 14/194,252 (now US Patent Publication US 2014-0249397 A1); U.S. Provisional Patent Application Ser. No. 61/869,526 (now US Patent Publication US 2015-0057770 A1); U.S. Provisional Patent Application Ser. No. 61/909,786 (now U.S. Non-Provisional patent application Ser. No. 14/553,657); U.S. Provisional Patent Application Ser. No. 61/954,379 (now U.S. Non-Provisional patent application Ser. No. 14/658,552); U.S. Provisional Patent Application Ser. No. 61/881,064 (now U.S. Non-Provisional patent application Ser. No. 14/494,274); U.S. Provisional Patent Application Ser. No. 61/894,263 (now U.S. Non-Provisional patent application Ser. No. 14/520,081); and U.S. Provisional Patent Application Ser. No. 61/915,338 (now U.S. Non-Provisional patent application Ser. No. 14/567,826) are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable electronic device operable to automatically identify and recover from operational errors, the wearable electronic device comprising:

at least one sensor responsive to at least one input effected by a user of the wearable electronic device, wherein in response to the at least one input the at least one sensor provides sensor signals;

a processor communicatively coupled to the at least one sensor; and a non-transitory processor-readable storage medium communicatively coupled to the processor, wherein the non-transitory processor-readable storage medium stores processor-executable sensor signal processing instructions and processor-executable state determination instructions, wherein the state determination instructions include a variable that determines an operational state of the processor, and wherein, when the state determination instructions are executed by the processor, the state determination instructions cause the processor to:

automatically identify when the wearable electronic device encounters an operational error based on a determination that the sensor signal processing instructions are not calibrated; and
automatically recover from the operational error, wherein to automatically recover from the operational error the state determination instructions cause the processor to:
enter a standby state automatically in response to the determination that the sensor signal processing instructions are not calibrated, wherein in the standby state the processor recognizes a first indication from the user, wherein the first indication from the user is a rest gesture performed by the user, the rest gesture indicative that the user is ready to calibrate the wearable electronic device;
enter a calibration state automatically in response to a recognition of the first indication from the user while the processor is in the standby state, wherein in the calibration state the processor recognizes a second indication from the user and calibrates the sensor signal processing instructions in response to the second indication from the user; and
enter an active state automatically in response to calibrating the sensor signal processing instructions while the processor is in the calibration state, wherein in the active state the processor executes the calibrated sensor signal processing instructions, and wherein when executed by the processor the calibrated sensor signal processing instructions cause the processor to process at least one input effected by the user based at least in part on the calibration of the sensor signal processing instructions from the calibration state.

2. The wearable electronic device of claim 1 wherein the at least one sensor is responsive to at least one gesture performed by the user and provides sensor signals in response to the at least one gesture, and wherein the processor-executable sensor signal processing instructions include processor-executable gesture identification instructions that, when executed by the processor while the processor is in the active state, cause the processor to identify at least one gesture performed by the user based at least in part on the calibration of the gesture identification instructions from the calibration state.

3. The wearable electronic device of claim 2 wherein the first indication from the user includes a recognition by the processor that the user has donned the wearable electronic device, and wherein the non-transitory processor-readable storage medium further stores processor-executable instructions that, when executed by the processor, cause the processor to recognize when the user dons the wearable electronic device as the first indication from the user in the standby state.

4. The wearable electronic device of claim 2 wherein the non-transitory processor-readable storage medium further stores processor-executable instructions that, when executed by the processor, cause the processor to:
recognize at least one reference gesture performed by the user as the second indication from the user in the calibration state; and
calibrate the gesture identification instructions based on the at least one reference gesture.

5. The wearable electronic device of claim 2 wherein the at least one sensor includes at least one muscle activity sensor selected from the group consisting of: an electromyography ("EMG") sensor and a mechanomyography ("MMG") sensor.

6. The wearable electronic device of claim 1 wherein the at least one sensor includes at least one inertial sensor selected from the group consisting of: an inertial measurement unit, an accelerometer, and a gyroscope.

7. The wearable electronic device of claim 1, further comprising:
at least one light-emitting diode ("LED") communicatively coupled to the processor, wherein the non-transitory processor-readable storage medium further stores processor-executable instructions that, when executed by the processor, cause the wearable electronic device to activate at least one of:
a first color of the at least one LED in response to the processor entering the standby state;
a second color of the at least one LED in response to the processor entering the calibration state; and/or
a third color of the at least one LED in response to the processor entering the active state.

8. The wearable electronic device of claim 1, further comprising:
a haptic feedback device communicatively coupled to the processor, wherein the non-transitory processor-readable storage medium further stores processor-executable instructions that, when executed by the processor, cause the processor to activate the haptic feedback module in response to at least one of:
entering the standby state;
entering the calibration state; and/or
entering the active state.

9. The wearable electronic device of claim 1 wherein the variable is a global variable that is accessed by, at least, both the processor- executable signal processing instructions and the processor-executable state determination instructions stored in the non-transitory processor-readable storage medium.

10. The wearable electronic device of claim 1 wherein, when executed by the processor, the state determination instructions cause the processor to:
monitor the sensor signals;
enter the wearable electronic device into a sleep state if a period of at least five seconds elapses with no input detected by the at least one sensor, and wherein in the sleep state at least some components of the wearable electronic device power down to conserve energy; and
wake the wearable electronics device out of the sleep state in response to an input detected by the at least one sensor while the wearable electronic device is in the sleep state.

11. A method of operating a wearable electronic device as a state machine to automatically identify and recover from operational errors, the wearable electronic device including at least one sensor responsive to at least one input effected by a user of the wearable electronic device, wherein in response to the at least one input the at least one sensor provides sensor signals, a processor communicatively coupled to the at least one sensor, and a non-transitory processor-readable storage medium communicatively coupled to the processor, wherein the non-transitory processor-readable storage medium stores at least: i) processor-executable state determination instructions that include a variable that determines an operational state of the processor, and ii) processor-executable sensor signal processing instructions, wherein the processor executes the state determination instructions to cause the wearable electronic device to perform the method, the method comprising:
automatically identifying when the wearable electronic device encounters an operational error based on a determination that the sensor signal processing instructions are not calibrated; and automatically recovering from the operational error, wherein automatically recovering from the operational error includes:
in response to the determination that the sensor signal processing instructions are not calibrated, automatically entering the processor into a standby state;
while the processor is in the standby state:
  detecting a first indication from the user by the wearable electronic device,
  wherein the first indication is a rest gesture performed by the user indicative that the user is ready to calibrate the sensor signal processing instructions; and
  recognizing the first indication from the user by the processor;
in response to recognizing the first indication from the user while the processor is in the standby state, automatically entering the processor into a calibration state;
while the processor is in the calibration state:
  detecting second indication from the user by the wearable electronic device;
  recognizing the second indication from the user by the processor; and
  calibrating the sensor signal processing instructions by the processor in response to recognizing the second indication from the user; and
in response to calibrating the sensor signal processing instructions while the processor is in the calibration state, automatically entering the processor into an active state;
while the processor is in the active state:
  detecting at least one input by the at least one sensor; and
  executing the calibrated sensor signal processing instructions by the processor, wherein executing the calibrated sensor signal processing instructions causes the processor to process the at least one input based on the calibration of the sensor signal processing instructions from the calibration state.

12. The method of claim 11 wherein the at least one sensor is responsive to at least one gesture performed by the user and provides sensor signals in response to the at least one gesture, and wherein the processor-executable sensor signal processing instructions include processor-executable gesture identification instructions, and wherein:
  entering the processor into the standby state in response to a determination that the sensor signal processing instructions are not calibrated includes entering the processor into the standby state in response to the determination that the gesture identification instructions are not calibrated;
  while the processor is in the standby state, detecting the first indication from the user by the wearable electronic device, the first indication from the user indicative that the user is ready to calibrate the sensor signal processing instructions includes detecting the first indication from the user by the wearable electronic device, the first indication from the user indicative that the user is ready to calibrate the gesture identification instructions;
  while the processor is in the calibration state, calibrating the sensor signal processing instructions by the processor in response to recognizing the second indication from the user includes calibrating the gesture identification instructions by the processor in response to recognizing the second indication from the user;
  entering the processor into the active state in response to calibrating the sensor signal processing instructions while the processor is in the calibration state includes entering the processor into the active state in response to calibrating the gesture identification instructions while the processor is in the calibration state;
  while the processor is in the active state, detecting at least one input by the at least one sensor includes detecting at least one gesture by the at least one sensor; and
  while the processor is in the active state, executing the calibrated sensor signal processing instructions by the processor includes executing the calibrated gesture identification instructions, wherein executing the calibrated gesture identification instructions causes the processor to identify the at least one gesture based on the calibration of the gesture identification instructions from the calibration state.

13. The method of claim 12 wherein, while the processor is in the standby state:
  detecting the first indication from the user by the wearable electronic device includes detecting, by the wearable electronic device, when the user dons the wearable electronic device; and
  recognizing the first indication from the user by the processor includes recognizing, by the processor, when the user dons the wearable electronic device.

14. The method of claim 12 wherein, while the processor is in the calibration state:
  detecting the second indication from the user by the wearable electronic device includes detecting, by the at least one sensor, a reference gesture performed by the user;
  recognizing the second indication from the user by the processor includes recognizing the reference gesture by the processor; and
  calibrating the gesture identification instructions by the processor in response to recognizing the second indication from the user includes calibrating the gesture identification instructions by the processor based on the reference gesture.

15. The method of claim 12 wherein the at least one sensor includes at least one muscle activity sensor selected from the group consisting of: an electromyography ("EMG") sensor and a mechanomyography ("MMG") sensor; and wherein:
  while the processor is in the active state, detecting at least one gesture by the at least one sensor includes detecting muscle activity by the at least one muscle activity sensor when the user performs the at least one gesture.

16. The method of claim 12 wherein the at least one sensor includes at least one inertial sensor selected from the group consisting of: an inertial measurement unit, an accelerometer, and a gyroscope; and wherein:
  while the processor is in the active state, detecting at least one gesture by the at least one sensor includes detecting motion of the wearable electronic device by the at least one inertial sensor when the user performs the at least one gesture.

17. The method of claim 11 wherein the wearable electronic device further includes at least one light-emitting diode ("LED") communicatively coupled to the processor, and wherein the method further comprises at least one of:
  activating a first color of the at least one LED by the processor in response to entering the standby state;
  activating a second color of the at least one LED by the processor in response to entering the calibration state; and/or
  activating a third color of the at least one LED by the processor in response to entering the active state.

18. The method of claim 11 wherein the wearable electronic device further includes a haptic feedback device communicatively coupled to the processor, and wherein the method further comprises at least one of:
- activating the haptic feedback device by the processor in response to entering the standby state;
- activating the haptic feedback device by the processor in response to entering the calibration state; and/or
- activating the haptic feedback device by the processor in response to entering the active state.

19. The method of claim 11, further comprising:
- monitoring the sensor signals by the processor;
- in response to the processor monitoring a period of at least five seconds with no input detected by the at least one sensor, entering the wearable electronic device into a sleep state in which at least some components of the wearable electronic device power down to conserve energy; and
- in response to an input detected by the at least one sensor while the wearable electronic device is in the sleep state, waking the wearable electronic device out of the sleep state by the processor.

\* \* \* \* \*